US009095838B2

(12) United States Patent
Walker et al.

(10) Patent No.: US 9,095,838 B2
(45) Date of Patent: Aug. 4, 2015

(54) ADSORBENT FOR REMOVAL OF AMMONIA FROM AIR STREAMS

(71) Applicants: Scott Technologies, Inc., Boca Raton, FL (US); Nanoscale Materials, Inc., Manhattan, KS (US)

(72) Inventors: Brandon W. Walker, Wamego, KS (US); Olga B. Koper, Dublin, OH (US); Slawomir Winecki, Dublin, OH (US); Christopher L. Aikens, Manhattan, KS (US); Amy Elizabeth Quiring, Matthews, NC (US); Maciej Stanislaw Matyjaszczyk, Monroe, NC (US); Martin Keller, Indian Trail, NC (US)

(*) Notice: Subject to any disclaimer, the term of this patent is extended or adjusted under 35 U.S.C. 154(b) by 190 days.

(21) Appl. No.: 13/944,915

(22) Filed: Jul. 18, 2013

(65) Prior Publication Data

US 2013/0298768 A1     Nov. 14, 2013

Related U.S. Application Data

(63) Continuation of application No. PCT/US2012/021940, filed on Jan. 20, 2012.

(60) Provisional application No. 61/434,747, filed on Jan. 20, 2011.

(51) Int. Cl.
*B01J 20/00* (2006.01)
*B01J 20/20* (2006.01)
(Continued)

(52) U.S. Cl.
CPC .............. *B01J 20/20* (2013.01); *B01D 39/2093* (2013.01); *B01D 53/02* (2013.01); *B01D 53/58* (2013.01); *B01J 20/0244* (2013.01); *B01J 20/046* (2013.01); *B01J 20/06* (2013.01);
(Continued)

(58) Field of Classification Search
CPC .... B01D 53/02; B01D 53/58; B01D 39/2093; B01D 2253/112; B01D 2255/20707; B01D 2255/20792; B01D 2257/406; B01D 2239/0407; B01J 20/0244; B01J 20/046; B01J 20/06; B01J 20/20; B01J 20/28077; B01J 20/28066; B01J 20/3204; B01J 20/3236; B01J 2220/62; B82Y 30/00
USPC .............. 95/90, 128, 900; 96/153; 423/237, 423/239.1, 352; 502/400, 439, 350
See application file for complete search history.

(56) References Cited

U.S. PATENT DOCUMENTS 6,093,236 A * 7/2000 Klabunde et al. ................ 95/128
7,566,393 B2 * 7/2009 Klabunde et al. ......... 208/208 R
(Continued)

*Primary Examiner* — Frank Lawrence
(74) *Attorney, Agent, or Firm* — Wyatt B. Pratt

(57) ABSTRACT

An improved air purification adsorbent is disclosed. The air purification adsorbent comprises titanium dioxide ($TiO_2$) impregnated with zinc chloride (ZnCl2). The adsorbent may be used in air purification systems for removing ammonia from air streams. The nanocrystalline (amorphous) structure of the adsorbent results in a higher density of surface defects, higher surface area, and higher reactivity which, when combined with the synergistic effect of $ZnCl_2$ and the nanocrystalline $TiO_2$, provides a significantly longer breakthrough time of ammonia as compared with breakthrough time from unimpregnated nanocrystalline $TiO_2$, the commercial (crystalline) $TiO_2$ impregnated with $ZnCl_2$, pure $ZnCL_2$, and other commercially available adsorbents of ammonia. Other embodiments are described and claimed.

18 Claims, 8 Drawing Sheets

(51) Int. Cl.

| | | |
|---|---|---|
| *B01D 53/02* | (2006.01) | |
| *B01D 53/58* | (2006.01) | |
| *B01J 20/02* | (2006.01) | |
| *B01J 20/06* | (2006.01) | |
| *B01J 20/28* | (2006.01) | |
| *B01J 20/32* | (2006.01) | |
| *B01J 20/04* | (2006.01) | |
| *B01D 39/20* | (2006.01) | |
| *B82Y 30/00* | (2011.01) | |

(52) U.S. Cl.
CPC ...... *B01J20/28007* (2013.01); *B01J 20/28066* (2013.01); *B01J 20/3204* (2013.01); *B01J 20/3236* (2013.01); *B82Y 30/00* (2013.01); *B01D 2239/0407* (2013.01); *B01D 2253/112* (2013.01); *B01D 2255/20707* (2013.01); *B01D 2255/20792* (2013.01); *B01D 2257/406* (2013.01); *B01J 2220/62* (2013.01)

(56) References Cited

U.S. PATENT DOCUMENTS

| | | |
|---|---|---|
| 8,183,426 B2 | 5/2012 | Cole et al. |
| 2001/0042719 A1* | 11/2001 | Levy .............................. 210/660 |
| 2005/0000901 A1* | 1/2005 | Campbell et al. ............. 210/660 |
| 2005/0183577 A1 | 8/2005 | Brey et al. |
| 2008/0269186 A1 | 10/2008 | Bignozzi et al. |
| 2008/0271602 A1* | 11/2008 | Tatarchuk et al. .............. 95/135 |
| 2009/0118562 A1 | 5/2009 | Cole et al. |
| 2010/0101413 A1* | 4/2010 | Jones et al. ..................... 95/141 |

* cited by examiner

ADSORBENT FOR REMOVAL OF AMMONIA FROM AIR STREAMS

CROSS-REFERENCE TO RELATED APPLICATIONS

This application is a continuation of International Patent Application No. PCT/US2012/021940 filed Jan. 20, 2012, which claims the benefit of U.S. Provisional Patent Application No. 61/434,747 filed Jan. 20, 2011, the contents of both of which are incorporated by reference herein.

FIELD OF THE DISCLOSURE

The invention is generally related to air purification systems and methods, and more particularly to systems and methods for removing ammonia from air streams.

BACKGROUND OF THE DISCLOSURE

Air-purifying respirators are used in a variety of applications to protect the user from inhaling potentially life-threatening concentrations of compounds that can have adverse health effects with prolonged exposure. Typically, such air-purifying respirators include at least one activated carbon filtration element to remove toxic gases such as ammonia from the user's airstream. Though activated carbon can be used with some success, it has limitations, particularly in dry and humid conditions. Traditional extended surface area substrates typically must be enhanced by reducing the particle size distribution of materials. This can result in increased breathing resistance or the potential for reducing the particulate size of the adsorptive media such that it could become respirable and no longer retained in the filtration device.

Typically, ammonia adsorbents are high surface area materials such as activated carbons or zeolites. Due to the low boiling point of ammonia, these materials are not suitable to trap ammonia vapors irreversibly. Zeolites, with their small micropore sizes, are better at trapping ammonia; however, since zeolites and high activity activated carbon alone do not destroy the compound, it is possible for the adsorbent to release the ammonia. To overcome this problem, most adsorbents are impregnated with a chemical that can react and neutralize the ammonia vapors. Most commonly, these materials are acids (citric acid, phosphoric acid, or sulfuric acid) or transition metal salts (Cu, Zn).

U.S. Pat. No. 7,309,513 B2, December 2007, Brey et al. describes a broad-spectrum filter media that use Cu and Zn salts as ammonia-sensitive impregnants. The adsorbent also is impregnated with ammonium sulfate that can decompose to form an acidic material. GC-IPA from General Carbon Corporation (Paterson, N.J., USA) employs phosphoric acid (up to 45%) on coal-based carbon to neutralize ammonia. PICA USA, Inc. (Columbus, Ohio, USA) uses a coconut shell activated carbon impregnated with zinc chloride to adsorb ammonia (Picatox AM80).

High surface area materials (carbon, alumina, zeolites) are commonly used for air filtration because they can remove many contaminants. The ability of these materials to remove certain chemicals greatly depends on the chemical composition of the adsorbent, surface area, and pore size. The removal also depends on the chemical and physical properties of the contaminant. These properties determine whether a contaminant is physisorbed or chemisorbed. Physisorbed contaminants are usually only weakly bound and can be released with changes in temperature. Chemisorbed materials undergo a chemical reaction on the adsorbent surface and are thus converted to a different material. Activated carbons, while containing very high surface areas, are insufficient to adsorb low boiling point compounds such as ammonia, thus some type of impregnant is required to react and trap the contaminant. Impregnation of any support involves a balance of loading a sufficient amount of the reactive impregnant without destroying the high surface area of the support. Some types of metal oxides have shown the capability to adsorb ammonia, but high surface area materials are necessary to adsorb any significant amount.

There remains a need for an improved filtration medium for removing ammonia from air streams.

SUMMARY OF THE DISCLOSURE

An improved air purification adsorbent is disclosed. The air purification adsorbent comprises titanium dioxide ($TiO_2$) impregnated with zinc chloride (ZnCl2). The adsorbent may be used in air purification systems for removing ammonia from air streams.

The nanocrystalline (amorphous) structure of the adsorbent results in a higher density of surface defects, higher surface area, and higher reactivity which, when combined with the synergistic effect of $ZnCl_2$ and the nanocrystalline $TiO_2$, provides a significantly longer breakthrough time of ammonia as compared with breakthrough time from unimpregnated nanocrystalline $TiO_2$, the commercial (crystalline) $TiO_2$ impregnated with $ZnCl_2$, pure $ZnCL_2$, and other commercially available adsorbents of ammonia.

The synergistic effect of the $ZnCl_2$ and $TiO_2$ in their nano form provides significant increase in time to breakthrough for $NH_3$ compounds, at dry and humid conditions, which typically represent a challenge using traditional activated carbons (whether metal or acid impregnated). The unique morphology of the materials allow edges, corners and other surfaces to be used as reaction or adsorption sites, offering great benefit over traditional extended surface area substrates that typically must be enhanced by reducing the particle size distribution of materials. This can result in increased breathing resistance or the potential for reducing the particulate size of the adsorptive media such that it could become respirable and no longer retained in the filtration device.

Thus, a filter medium is disclosed, comprising a high surface area substrate including a nanocrystalline metal oxide and an impregnant comprising a chloride salt of a transition metal. In some embodiments, the substrate includes titanium dioxide. The substrate may comprise crystallite sizes in the range of 2-10 nm. In other embodiments at least a portion of the chloride comprises zinc chloride. In still other embodiments, the chloride material is present in an amount of less than about 30 weight percent (wt %). In some embodiments, impregnating the nanocrystalline material with the chloride salt of a transition metal may substantially increase the filter medium's ability to adsorb ammonia.

A method is disclosed for forming a filter media. The method may include: impregnating a high surface area substrate comprising a nanocrystalline metal oxide with an impregnant comprising a chloride salt of a transition metal. The substrate may comprises titanium dioxide. The substrate may comprise crystallite sizes in the range of 2-10 nm. The chloride salt may comprise zinc chloride. The impregnating step may result in the chloride salt being present in the filter media in an amount of less than about 30 wt %. Impregnating the nanocrystalline material with the chloride salt of a transition metal may substantially increase the filter media's ability to adsorb ammonia.

A method is disclosed for purifying an airstream. The method may comprise: passing air through a adsorbent comprising a high surface area substrate including a nanocrystalline metal oxide impregnated with a chloride salt of a transition metal. The substrate may comprise titanium dioxide. The substrate may crystallite sizes in the range of 2-10 nm. The chloride salt may comprise zinc chloride. The chloride salt may be present in an amount of less than about 30 wt %. In some embodiments, passing air through the adsorbent comprises removing ammonia gas from the airstream.

BRIEF DESCRIPTION OF THE DRAWINGS

By way of example, a specific embodiment of the disclosed device will now be described, with reference to the accompanying drawings.

DETAILED DESCRIPTION

An improved air purification adsorbent is disclosed. The air purification adsorbent comprises titanium dioxide ($TiO_2$) impregnated with zinc chloride (ZnCl2). The adsorbent may find use in removing ammonia from air streams.

The ability to filter specific contaminants from an air stream has uses in many areas including respirator filtration elements comprising air-purifying respirators for individual protection and collective protection air filtration scrubbers. The disclosed filter media (adsorbent) filters a greater amount of ammonia from a contaminated air stream as compared to current materials. By placing this adsorbent into a respirator cartridge, this material can provide protection from ammonia vapors for a longer period of time as compared to current commercially available adsorbents.

Figure 1:
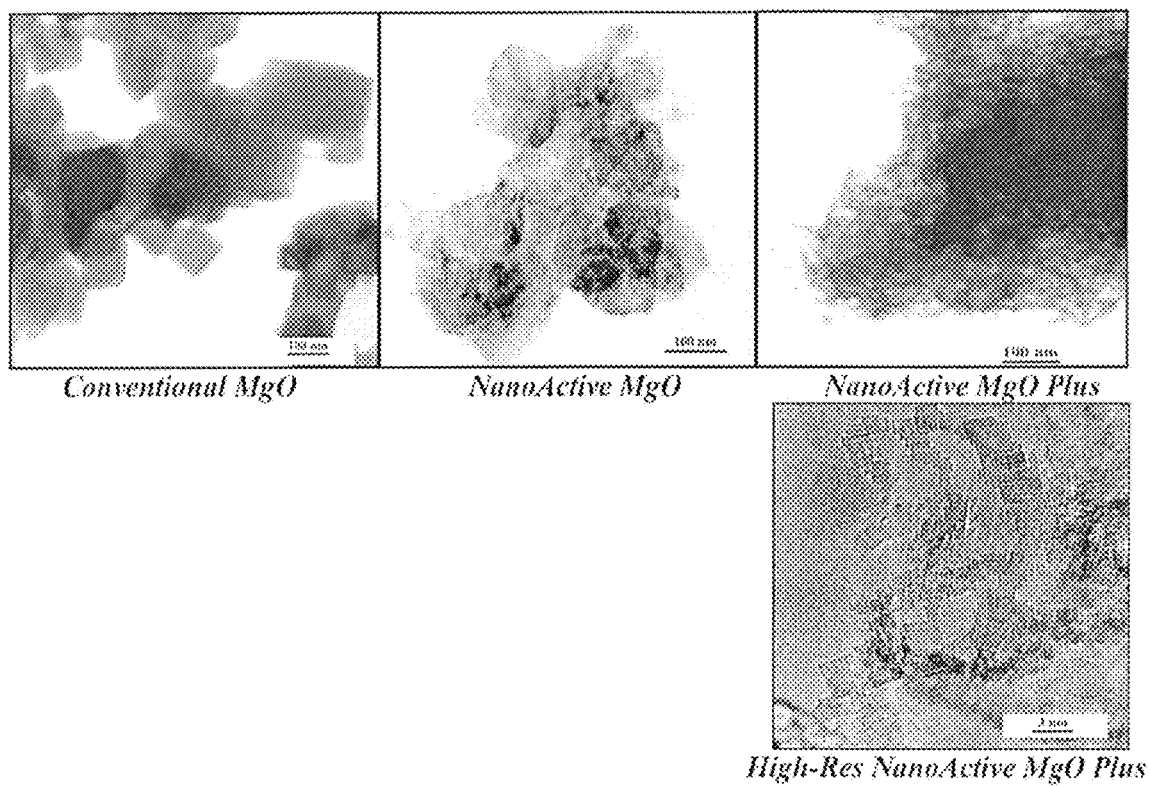
FIG. 1 shows a Transmission Electron Microscopy (TEM) image of magnesium oxides with the scale bar of top row micrographs is 100 nm, and the scale bar of the bottom row micrograph is 3 nm.

NanoScale Corporation's NanoActive® (NA) nanocrystalline metal oxides have large numbers of edge and corner defect sites, much higher surface area, and much more chemical reactivity than their bulk counterparts. FIG. 1 shows a comparison of conventional MgO and two nano materials, NanoActive® MgO and NanoActive® MgO Plus. Specifically, FIG. 1 shows a series of Transmission Electron Microscopy (TEM) image of Magnesium Oxides. The scale bar of top row micrographs is 100 nm, while the scale bar of the bottom row micrograph is 3 nm. The conventional sample consists of ~100 nm cubes with low porosity. NanoActive® MgO is composed of hexagonal platelets, 80 nm long and 10 nm thick, which create a porous web-like material. The high resolution TEM of NanoActive® MgO Plus shows very small 2-4 nm cubes that aggregate into interconnected polyhedral structures, forming a highly porous material with numerous, low-coordinate corners and edge sites.

Figure 2:
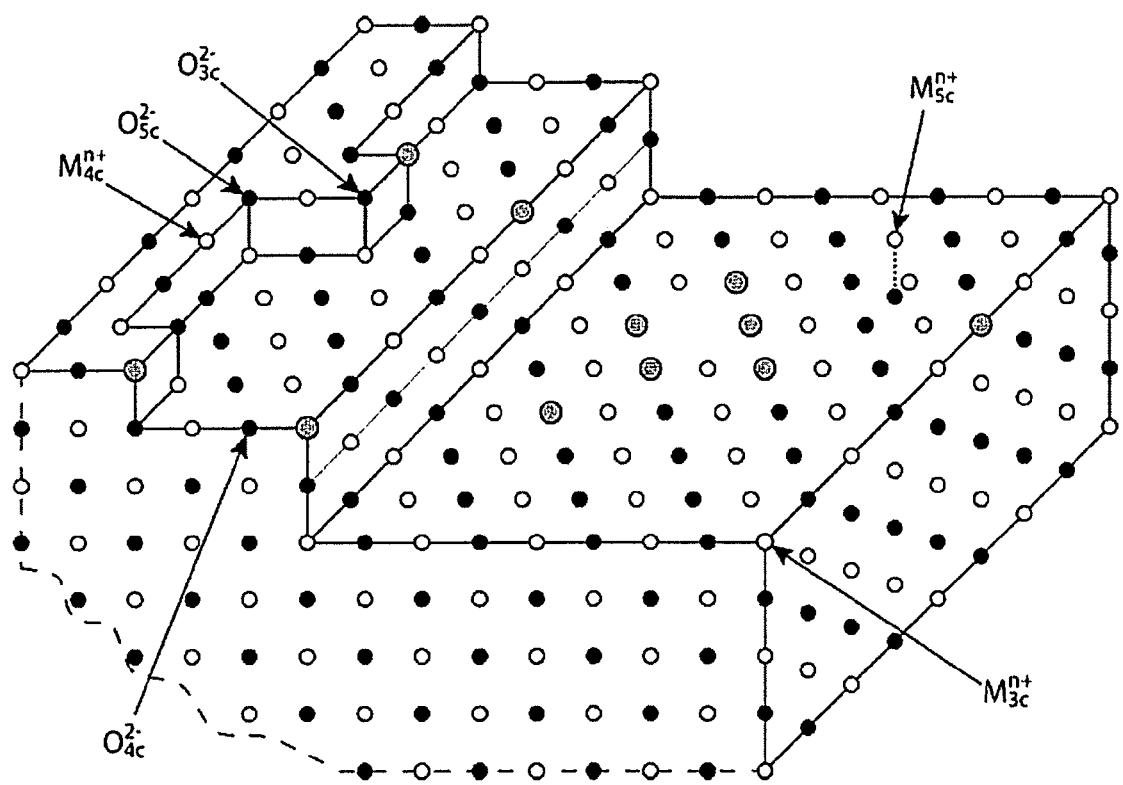
FIG. 2 is a conceptual diagram of a reactive metal oxide crystal, showing many different coordinated unsaturated sites, and vacancy sites.

A conceptual view of a defective metal oxide crystal is shown in FIG. 2. Specifically, FIG. 2 is a conceptual diagram of a reactive metal oxide crystal, with many different coordinatively unsaturated sites, as well as a vacancy defect site. Cation (M2+) sites in the interior of the crystal (not visible) have a coordination number of 6, surface cations have a coordination number of 5, edge cations have a coordination number of 4, and corner sites have a coordination number of 3. A surface vacancy defect reduces the coordination number of surrounding ions. In general, the lower the coordination number of a cation site, the higher its reactivity.

Figure 3:
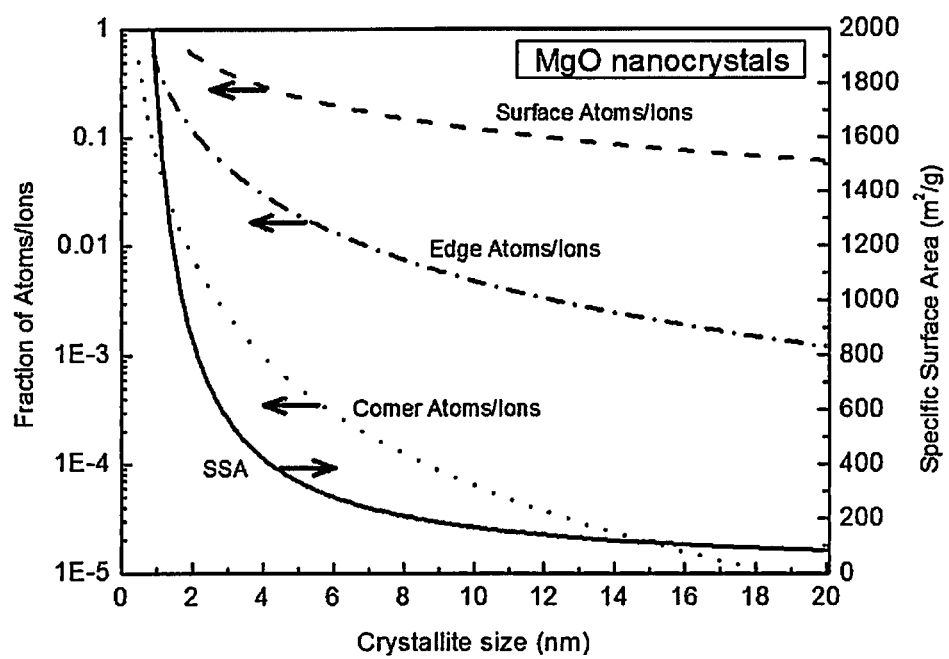
FIG. 3 is a graph showing Specific Surface Area (SSA) and fractions of surface, edge, and corner atoms/ions for MgO nano-crystals of different sizes.

FIG. 3 shows Specific Surface Area (SSA) and fractions of surface, edge, and corner atoms/ions for MgO nanocrystals of different sizes based on simple theoretical calculations for cubic crystals. Theoretically, nanocrystalline materials with crystal size of 2 nm have a specific surface area exceeding 1000 $m^2$/g, 50% of surface ions, 10% of edge ions, and 1% of corner ions. Although real nanocrystalline materials contain somewhat smaller fractions of active sites due to crystal agglomeration, their chemical reactivity is exceptionally high.

Such morphology results in enhanced chemical reactivity and suggests a two-step decomposition mechanism on nanoparticles (the first step being adsorption of a toxic chemical or agent on the surface by means of physisorption, followed by a second step—chemical decomposition). This two-step mechanism substantially enhances detoxification abilities of nanoparticles because it makes the decomposition less dependent on the rate of chemical reaction. The rate of chemical reaction depends on the agent-nanoparticle combination; therefore, for some agents the rate may be quite low. In addition, the reaction rate strongly decreases at lower temperatures. Because of these reasons, any detoxification method that relies only on chemical reactivity would not work for many toxic agents and would not be effective at low temperatures. Reactive nanoparticles do not have this drawback because surface adsorption remains active even at very low temperatures (in fact, physisorption is enhanced at low temperatures) and because all potential toxic agents are subject to physisorption (which would then be followed by destructive adsorption).

Figure 4:
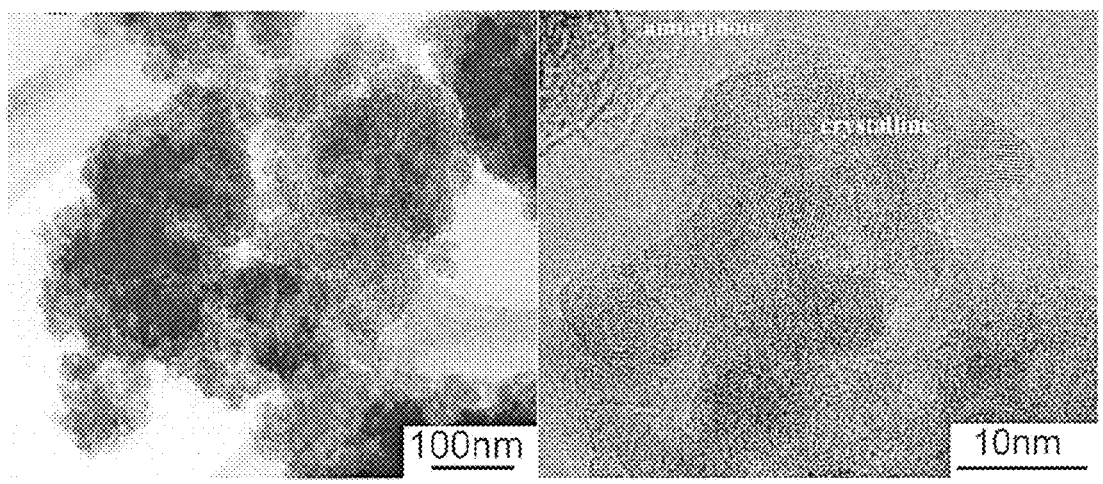
FIG. 4 shows a non-uniform aggregated structure containing both crystalline and amorphous $TiO_2$.

NanoActive $TiO_2$ (NA-$TiO_2$) is impregnated with $ZnCl_2$ during the titania synthesis process. The material consists of nanometer size crystallites with high specific surface area and a high fraction of corner and edge atoms (unsaturated sites) which are active sites for adsorption and catalytic reactions. FIG. 4 shows a non-uniform aggregated structure containing both crystalline and amorphous $TiO_2$ (surface area of 500 $m^2$/g). The amorphous fraction settles down on the surface of and in between individual nanocrystals. This combination of high surface area and increased reactivity allows titania to react with ammonia as well as provide a large surface area in which to deposit $ZnCl_2$ that can further react with ammonia. Due to the synergistic effect between the $ZnCl_2$ and the nanocrystalline $TiO_2$, the material's ability to adsorb ammonia is dramatically increased.

Figure 5:
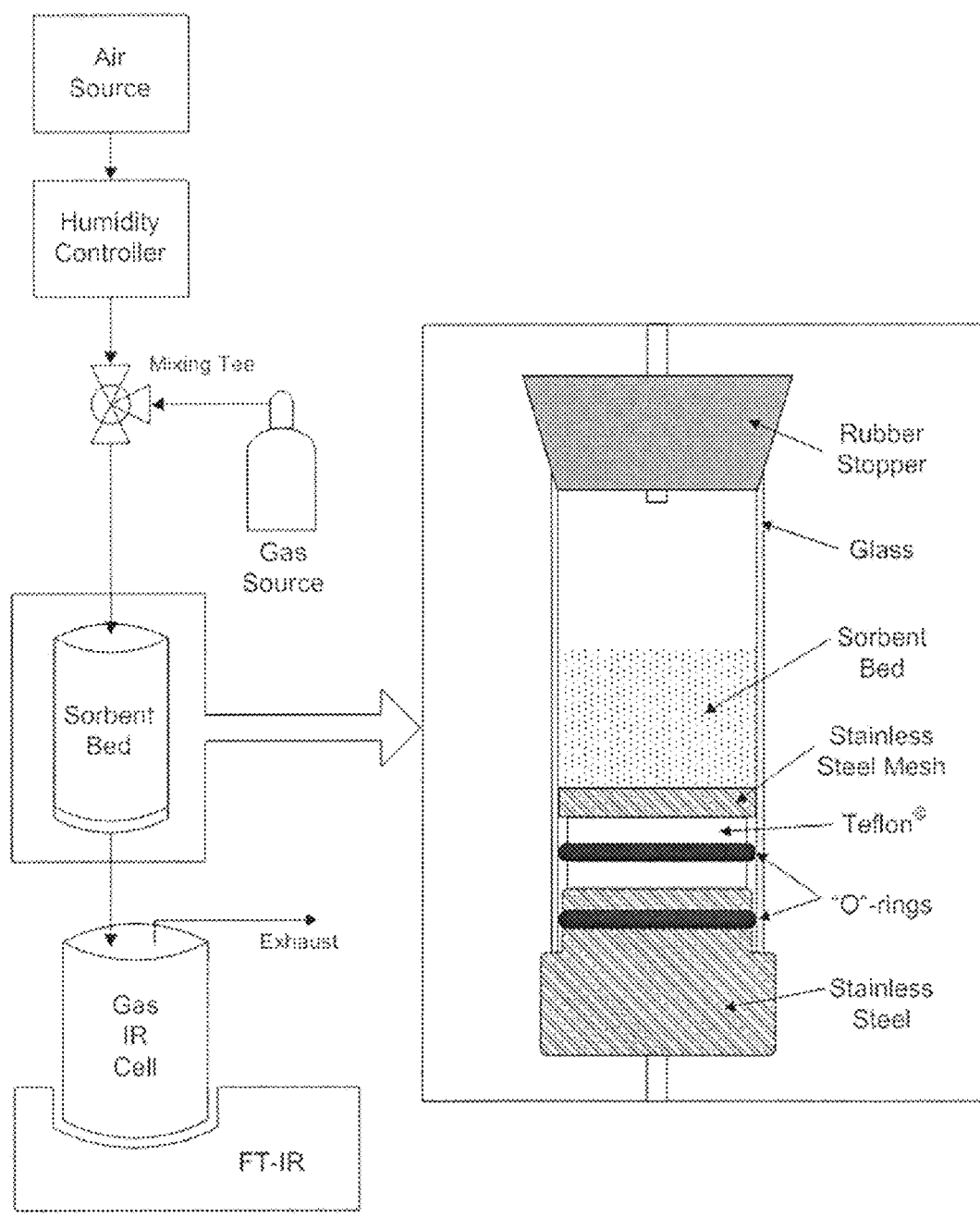
FIG. 5 is a schematic of a testing apparatus used to perform breakthrough testing.

FIG. 5 shows an exemplary breakthrough testing apparatus. All breakthrough tests were carried out using a testing tube which had an internal diameter of 30 mm. During the tests, the tube was filled with granulated adsorbent (mesh size 12-20) to a bed thickness of 37 mm. The air containing the contaminant flowed downward, to prevent a fluidized bed effect, with a rate of 5.3 liters per minute. Humidity of air passing through the tested adsorbent was controlled by a MNR Miller-Nelson Research, Inc. mass flow controller using dry, compressed air and distilled water. Breakthrough tests were carried out at 25% and 80% relative humidity. Air composition downstream of the bed was analyzed by a Nicolet 6700 FT-IR from Thermo Scientific with a Variable Pathlength Long Path Gas Cell 16-V, from Infrared Analysis, Inc. (Anaheim, Calif., USA). The path length of the cell was adjusted to its maximum value of 16 m. The ammonia was supplied by a lecture bottle of pure gas. The flow of the lecture bottle was adjusted so that when combined with the humidified air, the concentration of ammonia was 2500 ppm. Ammonia breakthrough was detected by the appearance of two sets of peaks at 970-920 $cm^{-1}$. The breakthrough time was calculated based on the area of these ammonia peaks. The breakthrough concentration for all tests was 12.5 ppm.

While previous commercial adsorbents for ammonia have shown high surface areas as well as having reactive impregnants, the disclosed material is highly nanocrystalline which leads to increased reactivity. This increased reactivity arises from the large amount of corner and edge sites. X-ray Diffraction (XRD) patterns of these materials show very broad peaks as compared to commercial mesoscale materials. Using Scherrer's equation, it is possible to calculate the crystallite size of a material based on the peak broadening observed by XRD. Fewer and broader peaks on NA-$TiO_2$ and on $ZnCl_2$ on NA-$TiO_2$ diffraction patterns indicate the amorphous nature of the NanoActive materials.

Figure 6:
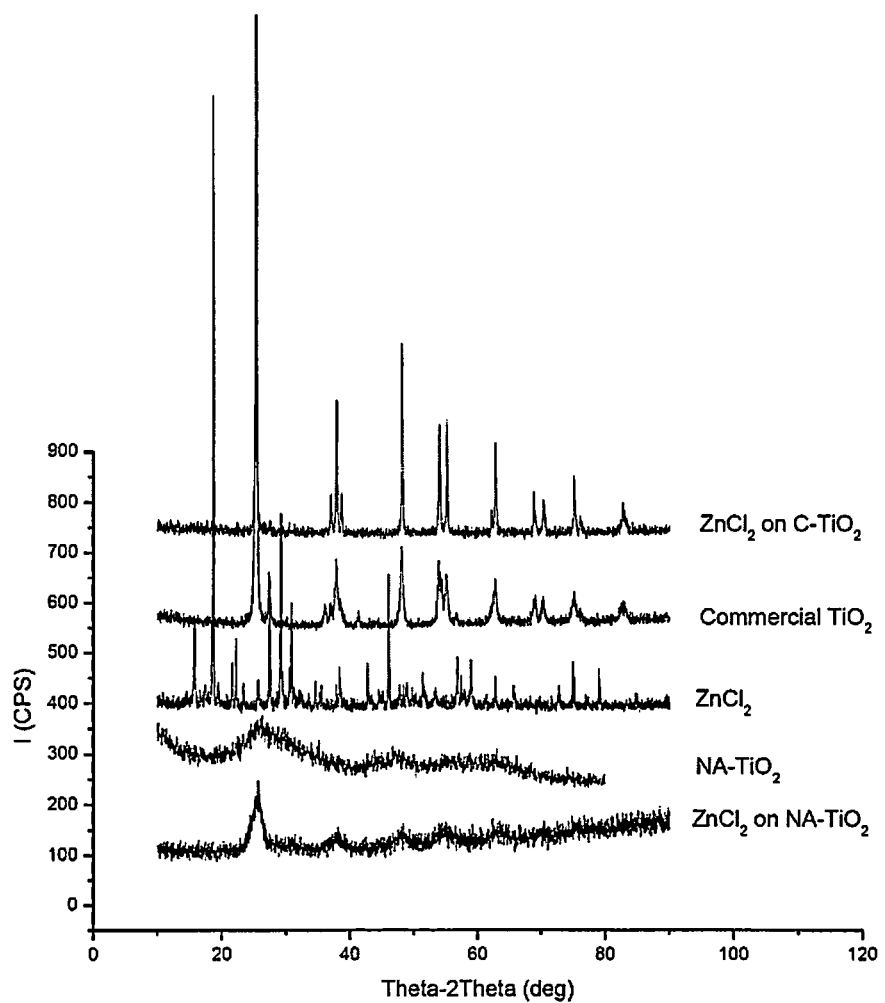
FIG. 6 shows X-ray Diffraction (XRD) spectra of a variety of adsorbents, including $ZnCL_2$ on $C-TiO_2$, commercial $TiO_2$, $ZnCl_2$, nanocrystalline $TiO_2$, and ZnCl on nanocrystalline $TiO_2$

FIG. 6 shows XRD spectra of a variety of adsorbents, including $ZnCL_2$ on C—$TiO_2$, commercial $TiO_2$, $ZnCl_2$, nanocrystalline $TiO_2$, and ZnCl on nanocrystalline $TiO_2$. The lack of long range order of the nanocrystalline structure means the crystallites are only a few nanometers in size. In the "amorphous" phase, (see FIG. 4), the crystallites will be even smaller. Once the nanocrystalline material is impregnated with $ZnCl_2$, the synergistic effect between the $ZnCl_2$ and the nanocrystalline $TiO_2$ greatly increases the adsorbent's ability to adsorb ammonia.

Surface areas and porosity was determined using a Quantachrome Nova 2200 BET instrument (Boynton Beach, Fla., USA). During the measurement, nitrogen gas was applied to the sample, which was immersed in a liquid nitrogen bath. The amount of nitrogen adsorbed was measured as a function of nitrogen pressure. The resulting adsorption isotherm was analyzed according to the Brunauer, Emmett, and Teller (BET) method. Chemical composition and crystallite size of metal oxide samples were determined using powder X-ray Diffraction (Kratos XDS-6000 Instrument, Manchester, U.K.). Using this technique, it is possible to determine if a powder is a pure metal oxide, a hydroxide, a carbonate, or a mixture of different forms. In addition, the crystallinity of the sample can be determined. To determine the crystallite size, the Scherrer equation was used:

$$\beta = \frac{K\lambda}{L\cos\theta}$$

where:
β is the "physical half-value width" (in degrees 2θ),
L is the crystallite size (dimension of the crystallite perpendicular to the diffracting net planes),
K is a constant (often taken as 0.9) and λ is the wavelength of the X-ray employed.

Materials prepared by NanoScale Corporation have crystallite sizes in the range 2-10 nm.

As can be seen by the data in Table 1 below, NanoActive $TiO_2$ impregnated with $ZnCl_2$ yielded much longer breakthrough times for ammonia compared to several commercial adsorbents. $ZnCl_2$ on NA-$TiO_2$ leads to longer breakthrough times despite smaller surface areas due to the higher density of active sites (defects) and the synergy between $ZnCl_2$ and NA-$TiO_2$. URC-3319 (Calgon Carbon Corporation, Pittsburgh, Pa., USA) is a broad spectrum impregnated activated carbon (used as is). GC-IPA (General Carbon Corporation, Paterson, N.J., USA) is an activated carbon impregnated with 20% phosphoric acid (used as is). Picatox AM80 (PICA USA, Inc., Columbus, Ohio, USA) is an activated carbon impregnated with zinc chloride (used as is). NanoActive $TiO_2$ is a high surface area, nanocrystalline titania synthesized by NanoScale Corporation. $ZnCl_2$ on NA-$TiO_2$ was prepared by impregnating $ZnCl_2$ (Fisher Scientific) on NanoActive $TiO_2$ by NanoScale Corporation. $ZnCl_2$ on commercial $TiO_2$ (C—$TiO_2$) was prepared by impregnating $ZnCl_2$ on commercial titania (Fisher Scientific) at NanoScale Corporation.

TABLE 1

Adsorbent properties and breakthrough results against $NH_3$.

| | Adsorbent Properties | | | $NH_3$ Breakthrough Time (min) | |
|---|---|---|---|---|---|
| Adsorbent | SSA ($m^2/g$) | Pore Size (Å) | Pore Volume ($cm^3/g$) | 25% RH | 80% RH |
| URC-3319 | 703 | 36 | 0.18 | 35 | 40 |
| GC-IPA | 147 | 40 | 0.09 | 28 | 64 |
| AM80 | 680 | 30 | 0.1 | 92 | 83 |
| NA-$TiO_2$ | 472 | 32 | 0.14 | 46 | 46 |
| $ZnCl_2$ on NA-$TiO_2$ | 216 | 17 | 0.18 | 122 | 120 |
| C—$TiO_2$ | 11 | 129 | 0.04 | 1 | 1 |
| $ZnCl_2$ on C—$TiO_2$ | 4 | 168 | 0.18 | 22 | 24 |
| $ZnCl_2$ | 0.5 | 22 | 0.0006 | N/A Material too hygroscopic | |

Figure 7:
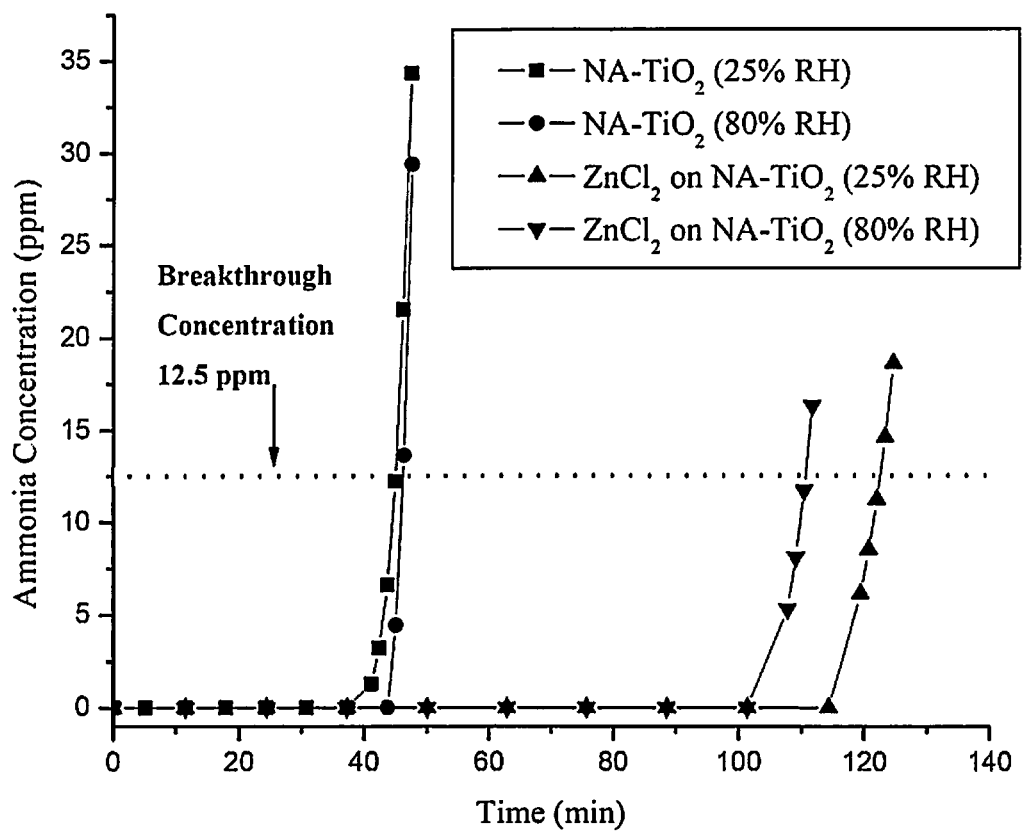
FIG. 7 is a graph of breakthrough curves of $TiO_2$ and $ZnCl_2$ on $TiO_2$ against $NH_3$ (2500 ppm challenge concentration) at 25 and 80% RH.
Figure 8:
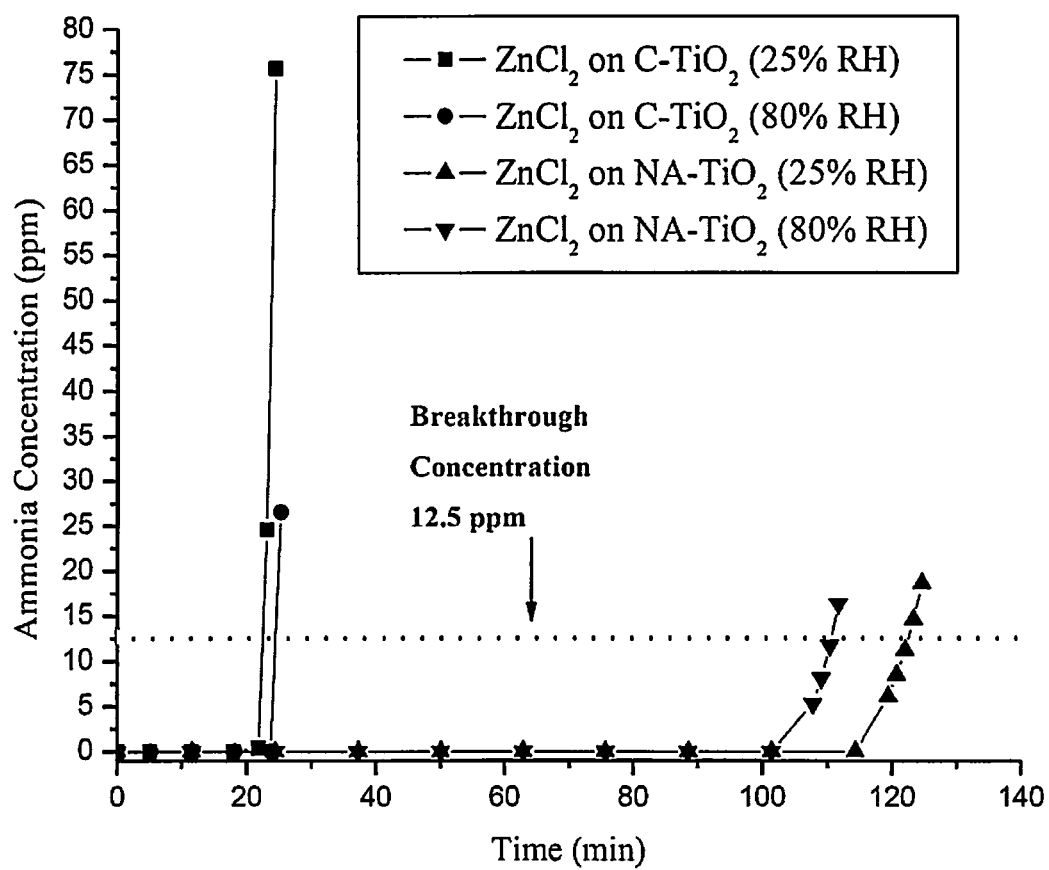
FIG. 8 is a graph of breakthrough curves of $ZnCl_2$ on $C-TiO_2$ and $ZnCl_2$ on NanoActive® $TiO_2$ against $NH_3$ (2500 ppm challenge concentration) at 25 and 80% RH.

Breakthrough curves are shown in FIGS. 7 and 8. Specifically, FIG. 7 shows breakthrough curves of NanoActive® $TiO_2$ and $ZnCl_2$ on NanoActive® $TiO_2$ against $NH_3$ (2500 ppm challenge concentration) at 25 and 80% RH, while FIG. 8 shows breakthrough curves of $ZnCl_2$ on C—$TiO_2$ and $ZnCl_2$ on NanoActive® $TiO_2$ against $NH_3$ (2500 ppm challenge concentration) at 25 and 80% RH.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:
1. A filter medium, comprising:
a high surface area substrate comprising a nanocrystalline metal oxide; and
an impregnant comprising a chloride salt of a transition metal.

2. The filter medium of claim 1, wherein the substrate comprises titanium dioxide.

3. The filter medium of claim 1, wherein the substrate comprises crystallite sizes in the range of 2-10 nm.

4. The filter medium of claim 1, wherein the chloride salt comprises zinc chloride.

5. The filter medium of claim 1, wherein the chloride salt is present in an amount of less than about 30 wt %.

6. The filter medium of claim 4, wherein impregnating the nanocrystalline material with the chloride salt of a transition metal substantially increases the filter medium's ability to adsorb ammonia.

7. A method of forming a filter media, comprising:
impregnating a high surface area substrate comprising a nanocrystalline metal oxide with an impregnant comprising a chloride salt of a transition metal.

8. The method of claim 7, wherein the substrate comprises titanium dioxide.

9. The filter medium of claim 7, wherein the substrate comprises crystallite sizes in the range of 2-10 nm.

10. The method of claim 7, wherein the chloride salt comprises zinc chloride.

11. The method of claim 7, wherein the impregnating step results in the chloride salt being present in the filter media in an amount of less than about 30 wt %.

12. The filter medium of claim 7, wherein impregnating the nanocrystalline material with the chloride salt of a transition metal substantially increases the filter media's ability to adsorb ammonia.

13. A method for purifying an airstream, comprising:
passing air through an adsorbent comprising a high surface area substrate including a nanocrystalline metal oxide impregnated with a chloride salt of a transition metal.

14. The method of claim 13, wherein the substrate comprises titanium dioxide.

15. The method of claim 13, wherein the substrate comprises crystallite sizes in the range of 2-10 nm.

16. The method of claim 13, wherein the chloride salt comprises zinc chloride.

17. The method of claim 13, wherein the chloride salt is present in an amount of less than about 30 wt %.

18. The method of claim 13, wherein passing air through the adsorbent comprises removing ammonia gas from the airstream.

* * * * *